United States Patent [19]

Barbier et al.

[11] Patent Number: 5,057,744
[45] Date of Patent: Oct. 15, 1991

[54] SYSTEM FOR THE DISPLAY OF LUMINOUS DATA WITH IMPROVED READABILITY

[75] Inventors: Bruno Barbier, Le Bouscat; Serge Ediar, St. Medar en Jalles; Jean Brun, Garches, all of France

[73] Assignee: Thomson CSF, Paris, France

[21] Appl. No.: 361,781

[22] Filed: May 30, 1989

Related U.S. Application Data

[63] Continuation of Ser. No. 176,339, Mar. 31, 1988, abandoned.

[30] Foreign Application Priority Data

Apr. 3, 1987 [FR] France ................. 87 04722

[51] Int. Cl.⁵ ............................ H01J 31/26
[52] U.S. Cl. ....................... 315/10; 358/168
[58] Field of Search ............ 315/10, 383; 358/69, 358/168, 169

[56] References Cited

U.S. PATENT DOCUMENTS 3,715,617  2/1973  Tilton et al. ................. 315/10

FOREIGN PATENT DOCUMENTS 0145966  6/1985  European Pat. Off.
2100454  3/1972  France.

OTHER PUBLICATIONS

Patent Abstract of Japan, vol. 9, No. 65, (E-304) (1788), Mar. 26, 1985, Ootake.

*Primary Examiner*—Theodore M. Blum
*Attorney, Agent, or Firm*—Cushman, Darby & Cushman

[57] ABSTRACT

A luminous data display system is used to improve readability depending on fluctuations in the light environment. It has automatic means to adjust the luminance of the image produced on a screen. These means use a first sensor close to the screen to obtain an indication of the ambient illumination received by the screen, and a second sensor, preferably placed on the helmet, to appreciate the distribution of luminance perceived in the observer's field of vision. Circuits process the detected signal and a manual adjustment signal to produce a correction signal applied to the image video signal.

8 Claims, 3 Drawing Sheets

SYSTEM FOR THE DISPLAY OF LUMINOUS DATA WITH IMPROVED READABILITY

This is a continuation of application Ser. No. 07/176,339, filed Mar. 31, 1988, now abandoned.

BACKGROUND OF THE INVENTION

1. Field of the Invention

The present invention pertains to a system for the display of data, represented in the form of a luminous image, the readability of which is improved in order to take into account fluctuations in the light environment.

Luminous data can be represented as either electronic images or luminous displays.

The invention is envisaged, more particularly, for head-down display devices in aeronautics.

2. Description of the Prior Art

The display of an electronic image, especially for a head-down application, is generally done on the screen of a cathode ray tube or on a flat panel. There are two main categories of flat panels, passive display flat panels which modulate light, for example, with liquid crystal cells, and active display flat panels that emit light, for example, plasma panels or electroluminescent panels.

In these systems, the luminous display is subjected to illumination which varies because of the light environment which itself varies. This can cause difficulties related to the readability of the display. This is especially so when the local illumination is too great to display an image on a cathode screen.

There are known methods for manually adjusting the luminance level of an image in electronic image display devices.

Such adjustment is inadequate because, in the case of head-down display on an instrument panel, the electronic image is shown to the pilot in a field of about 20° and the total image, seen by the observer, consists of this electronic image on which an unwanted light distribution is superimposed owing to the environment. In the 20° field of vision, the unwanted light distribution is the ambient radiation reflected by the display screen. Furthermore, the unwanted light radiation comprises the radiation included in the observer's total field of perception, the value of which is practically 180°. For a head-down application envisaged, this unwanted light is the light coming from outside the aircraft through the canopy of the cockpit.

An appreciation of the quality of the total image depends on the size of this unwanted luminance. The quality of the image further depends on the spatial/temporal distribution of the entire field perceived by the eye, i.e. firstly, on the value and spatial distribution of the light environment including the displayed image and the reflected unwanted radiation and the rest of the perceived visual field and, secondly, the value and spatial distribution of this light environment at prior moments, so as to take into account, in particular, retinal persistence on the part of the observer and slow variations in the diameter of the pupil.

An aim of the invention is to improve the readability of luminous displays taking into account this spatial/temporal distribution of luminance, corresponding to the unwanted light reflected by the display screen and the unwanted light perceived in the total field outside the display vision field.

According to the invention, the display system has sensor devices to measure this unwanted radiation by photodetection and to process it so as to affect the luminance of the displayed image in order to optimize its readability.

SUMMARY OF THE INVENTION

The invention relates to the making of a luminous data image display system comprising: a device to display the image on a screen, a means for the manual adjustment of the luminosity of the image; means for the automatic adjustment of the luminosity of the image, using two photoelectric sensors, with a first sensor mounted so as to be fixed and placed in the vicinity of the luminous image to pick up an ambient illumination representing the luminance reflected by the screen, and a second sensor located at a distance from the luminous image to pick up an ambient illumination representing the background luminance received in the observer's total field of vision.

DESCRIPTION OF THE DRAWINGS

The specific features and advantages of this invention will appear in the following description, given by way of example and made with reference to the appended figures, of which.

DESCRIPTION OF A PREFERRED EMBODIMENT

Figure 1:
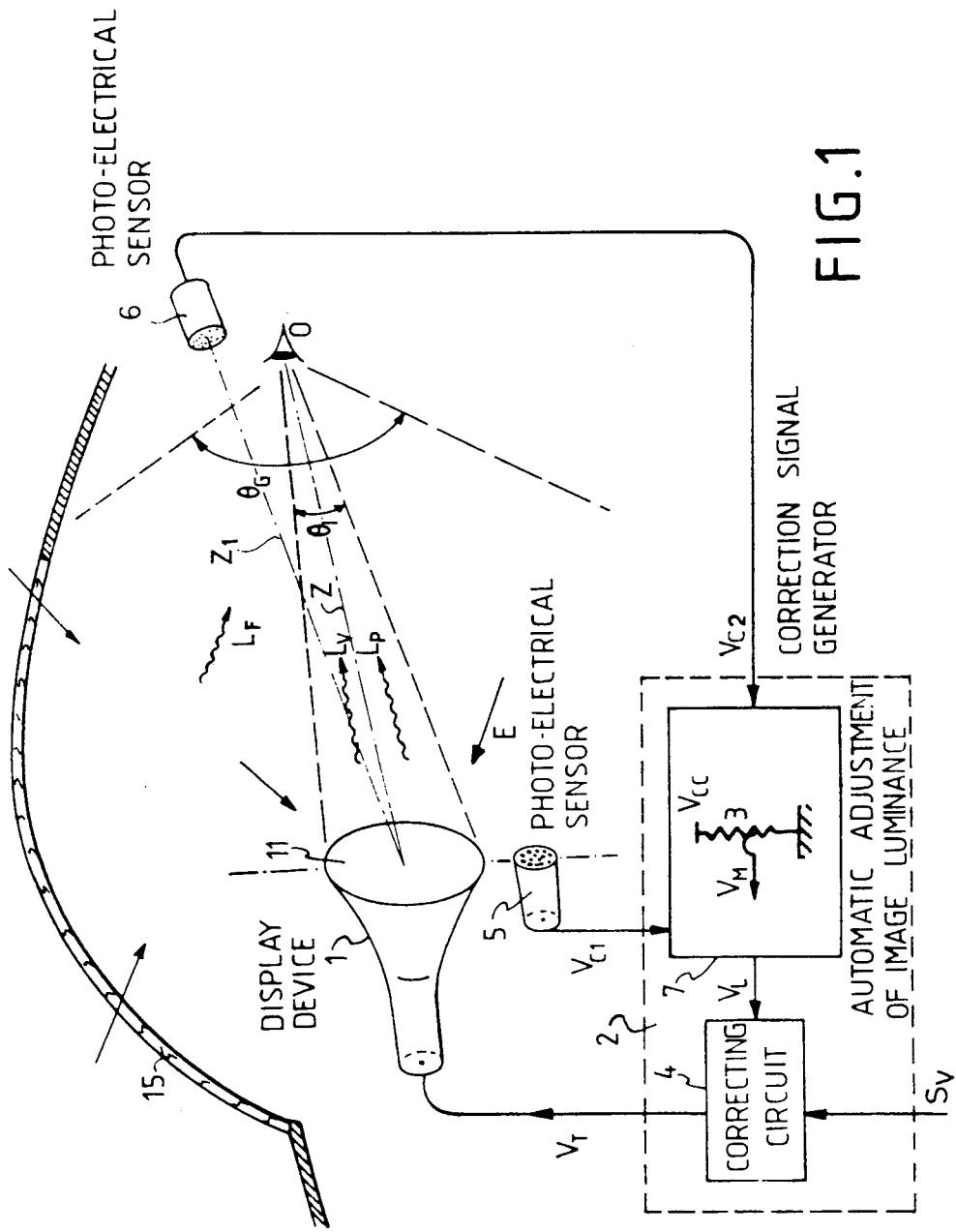
FIG. 1 is a simplified diagram of a display system for a luminous image according to the present invention.

Referring to FIG. 1, the display system comprises a luminous data image display device 1. This device may be a cathode ray tube as shown in the figure with the image displayed on the screen 11 of the tube. It is also possible to use a passive flat panel (liquid crystal matrix display) or an active flat panel (a plasma or electroluminescent panel) The video signal $S_v$, to be displayed, coming from the synthetic image generator or a video image pick-up device is applied to the tube 1, through an image luminance adjusting circuit 2. The circuit 2 conventionally comprises a manual adjustment device consisting of a potentiometer 3, the cursor output signal $V_m$ of which is used to act upon the luminance. This action takes place in a correcting circuit 4, for example by modulating the level of the signal $S_v$ by the parameter $V_m$. The action on the signal $S_v$ consists of a general modification of the luminance or chrominance levels, for example the modulation of the black level or of contrast for one or more colors or, yet again, a local modification such as the accentuation of a contour. The output signal $V_T$ is applied to the display device.

The manual adjustment device 3 is included in a generating circuit 7 which receives other adjusting data so that the luminance is automatically servo-controlled according to the characteristic parameters of the light environment.

For it can be considered that the observer placed at 0 perceives, in the demarcated field of observation of the light image $\theta_I$, a luminance $L_v$ corresponding to the luminance emitted by the light image at 11 in this cone. To this useful luminance is added the unwanted luminance $L_p$, sent back by the plane 11 under the effect of the ambient illumination E. For a cathode tube, the luminance $L_p$ results from the diffused reflection of the phosphor of the tube subjected to ambient illumination. Furthermore, the observer covers a greater total visual field $\theta_G$ which is sensitive to a distribution of background luminance $L_f$ outside the observation cone $\theta_I$.

To account for the influence of the unwanted luminances, $L_p$ and $L_f$, which hamper observation and image readability, the system comprises circuits for the automatic adjustment of image luminance according to these parameters. These circuits use at least two photoelectric sensors 5 and 6, the detected signals $V_{C1}$ and $V_{C2}$ of which are applied to the generator 7, including the manual adjustment device 3 to prepare a correction signal $V_L$ applied to the circuit 4. A first sensor 5 is placed near the light image, so that its photosensitive surface is subjected to an ambient illumination E comparable to that received by the display screen 11. Consequently, the output $V_{C1}$ of this sensor is directly proportionate to the local illumination E in this zone and contributes to giving data on the unwanted light $L_p$ re-emitted by the plane 11.

A second sensor 6 is placed near the observer's head or slightly behind, so as to receive an ambient illumination that gives data on the distribution of the background luminance $L_f$, perceived by the eye in the total field $\theta_G$ outside the useful field $\theta_1$. This data will be recovered at the level of the detected signal $V_{C2}$ which is substantially proportionate to the background luminance $L_f$.

Figure 2:
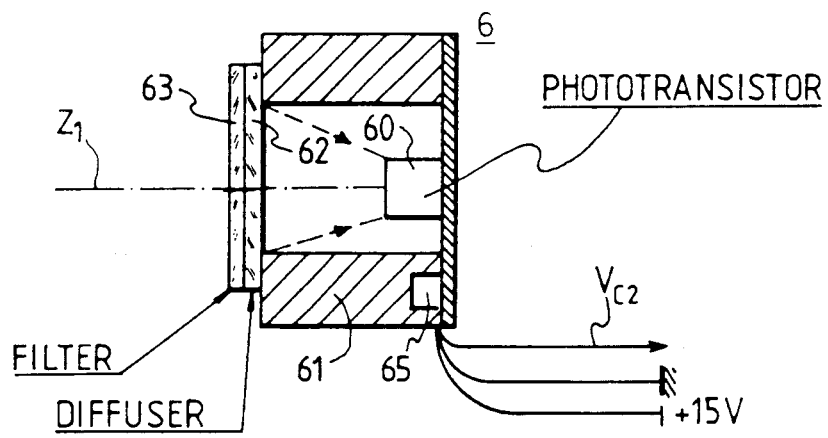
FIG. 2 is a diagram of an embodiment of the optoelectric sensor used to detect the light background.

The sensor 5 does not have any special characteristics and may be of a standard type. By contrast, to be made effective, the sensor 6 may be designed according to the embodiment shown in FIG. 2. This sensor 6 has a light and compact design and consists of a phototransistor 60, for example BPX 95C, fixed to the bottom of a housing 61, which has a diffuser 62 and a filter 63 on the opposite side. The housing 61 thus has a cylindrical central cavity which may be about 15 mm. deep and have a diameter of about 12 mm. The unit is small and light, and can be easily fixed to a helmet worn by the observer, namely the pilot in the case of an aeronautical application. FIG. 1 shows a partial schematic view of the glass canopy 15 of a cockpit through which solar illumination is transmitted. The angular sensitivity characteristic of the phototransistor 60 is modified by the diffuser 62 and by the dimensions of the window created by the internal cavity, so as to obtain vertical and horizontal directivity comparable to that of the eye. The filter 63 is a filter known in French as a "photopique" filter, i.e. a filter with spectral characteristics comparable to those of the eye to provide for the chromatic correction of the phototransistor 60. The sensitivity of the phototransistor 60 is adjusted by a potentiometer 65 located close to it. The connections include the detection output $V_{C2}$ and a d.c. power supply between +15 V and ground.

The sensor 5 is oriented so that its axis Z1 is substantially concurrent with the direction of vision Z of the observer at the display screen as shown in FIG. 1. It will preferably be attached to the observer's head, mounted on a helmet.

Figure 3:
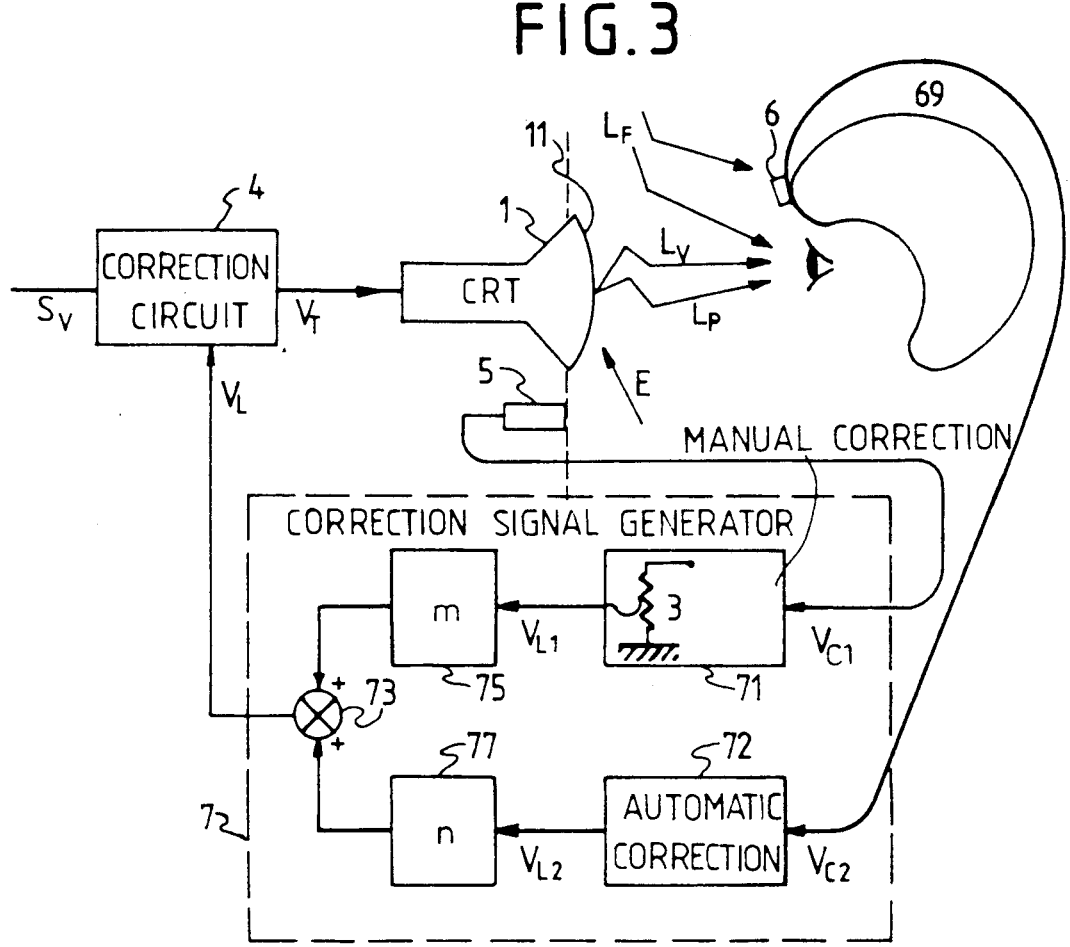
FIG. 3 is a block diagram of a system according to FIG. 1.

FIG. 3 shows the entire system and the circuits 7 in greater detail. These circuits include mainly the circuits 71 and 72, which respectively give the luminance correction signals, $V_{L1}$ and $V_{L2}$, from the detected signals $V_{C1}$ and $V_{C2}$. These correction signals are summated in the circuit 73 to form the resultant sum signal $V_L$ applied to the circuit 4. Intermediate circuits may be introduced to weight these values $V_{L1}$ and $V_{L2}$ by multiplier coefficients n and m when the system is being finally adapted to the configuration of the cockpit or to any other location in which its use may be envisaged.

The total correction signal $V_L$ therefore has the form $nV_{L1}+mV_{L2}$. The circuit 71 includes the manual adjustment device 3 and the signal VL1 is a function $F1(V_{C1},\theta_m)$ where $\theta_m$ represents the position of the manual adjustment. In this expression, $V_{C1}$ is equal to K1.E which indicates that the detected signal is proportionate to the illumination E given by the light environment. The correction value $V_{L2}$ given by the circuit 72 is a function $F2(V_{C2})$, with $V_{C2}=K2.L_f$ which expresses the proportionality of the signal detected at the mean background luminance.

According to one embodiment, the function F1, which relates to the correction value $V_{L1}$, has the form $F1=(a+b.E).\theta_m$, and the function F2 relating to the correction signal $V_{L2}$ has the form $c(L_o)^d$. In these expressions a, b, c and d are constants and $L_o$ is a reference value corresponding to a determined distribution of luminance for the adjustment.

In the case of a cathode ray display device, the luminance $L_v$ given by the display and having the form $K(V_T)^\gamma$, $V_T$ being the control voltage of the tube cathode. The function of the circuit 4 is to linearize the response of the tube with respect to the input signal $S_v$ so as to obtain: $L_v=K3.S_v$, an expression in which it is possible to write: $K3=K4.V_L$, K3 and K4 being constants. The result of this is that $L_v$ should be put in the form $K4.V_L.S_v$. The function provided by the circuit 4 can be put in the form $V_T=F3(V_L,S_v)$, F3 being determined so that: $K(V_T)^\gamma=K4.V_L.S_v$. For a cathode tube, the circuit 4 is a gamma correction circuit and its gain varies with the signal $V_L$. The circuits 71 and 72 are thus circuits that control gain according to the detected signals $V_{C1}$ and $V_{C2}$, hence according to the parameters $L_p$ and $L_f$. The circuit 4 linearizes the commands according to the product $V_L.S_v$. The voltage $V_L$ therefore acts on the slope of the linearized curve of luminance $L_v$ which depends on the electrical image $S_v$. The characteristics of the circuit 72 and the coefficients m and n are determined by a series of ergonomic measurements on the display system observed by a subject in an environment with a variable spatial/temporal distribution affecting the readability of the total image, and/or the diameter of the subject's pupil will be taken into account.

The transfer function describing the variations of $V_{L2}$ according to variations in luminance of a uniform, plane and white background $L_o$ typically has the above-mentioned form $c(L_o)^d$ where the coefficient d is adjusted so as to be equal, for example, to 0.88. The directivity of the sensor is, for example, such that half-sensitivity is reached for a variation of $\pm 10°$ in the vertical and horizontal planes and one-tenth sensitivity for a variation of $\pm 30°$ in the vertical plane and $\pm 45°$ in the horizontal plane.

The coefficients n and m depend on the configuration of the surrounding structure, namely the cockpit in an airborne application. The front illumination measuring cell 5 is sensitive only to the illumination of the instrument panel and this latter illumination is itself dependent on the lateral or rear illumination transmitted through the canopy and the illumination produced by reflections inside the cabin.

The photometrical sensor 6 carried by the helmet 69, or placed slightly behind the pilot's head, is sensitive firstly to the luminance of the front and lateral landscape and, secondly, to the illumination of the entire instrument panel, of which the display system is a part. This sensor 6 takes the variable, relative rate of these parameters into account inasmuch as it moves with the pilot's head.

Figure 4:
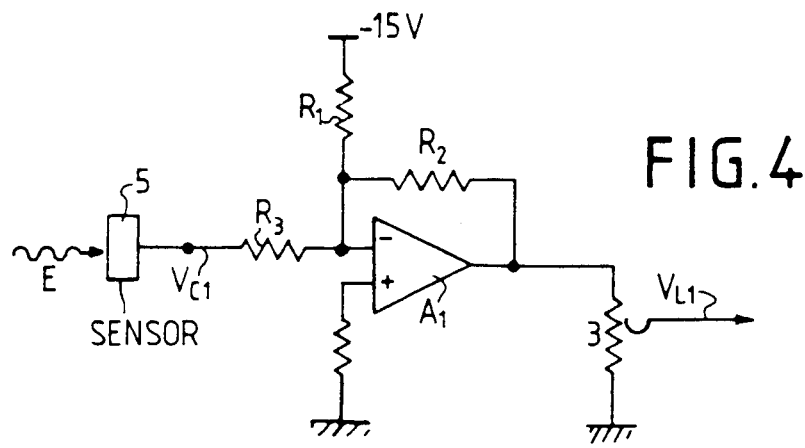
FIGS. 4, 5, and 6 are diagrams relating to the various circuits that can be used in the context of an embodiment of the system according to FIG. 3.

FIG. 4 shows an embodiment of the circuit 71. It has an operational amplifier A1 and a network of resistors R1, R2 and R3, used to produce the coefficients a and b in the above-mentioned expression of $V_{L1}$. The manual adjustment potentiometer 3 is placed at the output of the amplifier A1.

Figure 5:
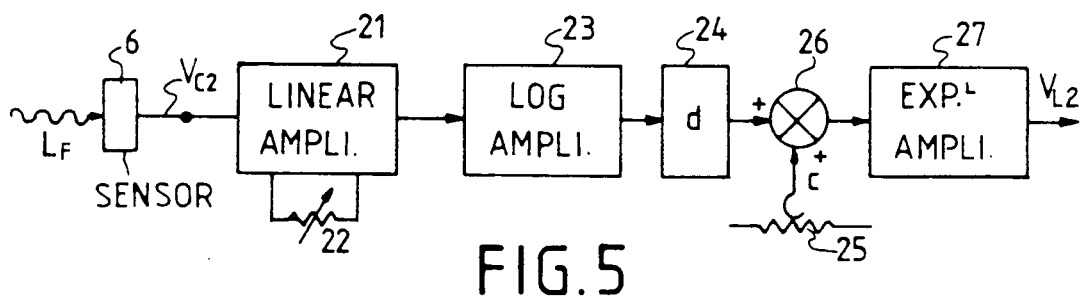

FIG. 5 relates to the circuit 72. The output $V_{C2}$ of the sensor 6 is first applied to a linear amplifier 21, which has a time constant adjustment device 22. Next there is a logarithmic amplifier 23 and then a weighting circuit 24 used to introduce the coefficient d and a potentiometer 25 used to introduce the coefficient c, while the remaining part comprises the adder 26 and the exponential amplifier 27 used to re-shape the signal VL2, with the form $c.(L_f)^d$, at the output.

Figure 6:
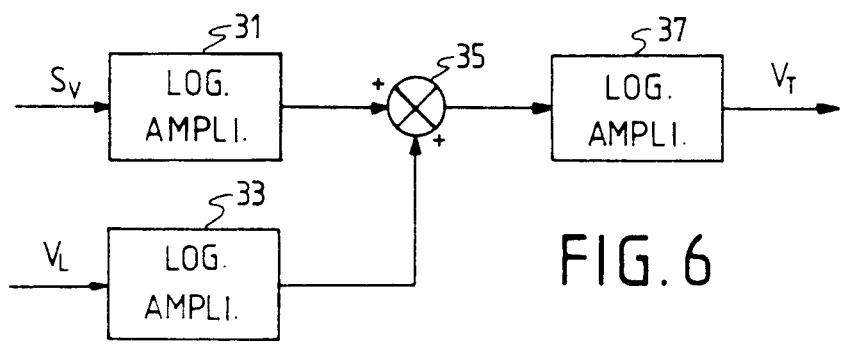

FIG. 6 is a simplified diagram of the circuit 4. The video signal $S_v$ is applied to a lgarithmic amplifier 31. At the same time, the correction signal $V_L$ is applied to a logarithmic amplifier 33. The outputs of these logarithmic amplifiers are summated in an adder circuit 35, the output of which is applied to an exponential amplifier 37 to produce the signal $V_T$.

The display system described has several alternative embodiments in conformity with the characteristics described. Instead of a sensor on either side, there may be several photosensitive elements so as to further optimize the readability of the image according to the spatial/temporal distribution of the light environment. The photosensitive sensors are distributed, in part, around the display system, while the other are on the observer himself and/or in the cockpit. Some of the sensors can be oriented towards the rear of the observer in order to measure the illumination received in the display system, while others can be oriented towards the front of the observer in order to measure the luminance values in a part of the observer's visual field or in his entire visual field. The sensor on the observer or in the cockpit may be oriented towards the front of this observer in order to measure the luminance values in a part of the observer's visual field or in his entire visual field. The sensors have a spectral and temporal sensitivity close to that of the cortico-visual system. The sensitivity of the sensors to illumination may differ from one sensor to another; some of them being sensitive to a bright environment (daytime illumination) while other will be sensitive to a low light intensity environment (nightime or twilight illumination). Each sensor comprises one or more sensors or a mosaic of sensors (photodiodes, photoresistors and phototransistors) which may or may not be preceded by an optical system. The sensors are coupled to a head-down, head-up, mid-height and lateral display system in an airborne application. The sensors may be coupled to one or more display systems contained in a cabin of an aircraft, a land vehicle or a sea-going vessel, or in any moving or fixed cabin where the light environment in the observer's visual field may undergo fast or slow variations.

The display system may be designed for the display of images, texts, symbols or simple light signals to produce internal or external public displays (for example, road sings, railway signs, displays for aeronautical and marine purposes, etc.). The display system is seen by the observer at a solid angle which is small enough for the rest of the field surrounding the system to affect the readability of the data. In this configuration, the sensors oriented towards the front of the observer may be fixed and designed for a mean observation position.

The optoelectric transducer which creates the image from the video signal $S_v$ is either a cathode ray tube or a flat panel which is passive (in transmission or reflection) or an emitting flat panel in front of which one or more electrically-controlled transmission filters (liquid crystal shutters) are placed.

The visibility of the display device can be adjusted through an electrical modification of the emission of light from an emitting transducer or from the rear source of a passive transducer or from transmission by an additional filter.

What is claimed is:

1. A luminous data image display system comprising:
    a device to display said image on a screen; and
    adjustment means for manual and automatic adjustment of a luminosity of the image, said adjustment means comprising:
    means for manual adjustment of the luminosity of the image,
    a first photoelectric sensor fixedly mounted in the vicinity of the luminous image and oriented to pick up an ambient illumination to provide a first detected signal representing the luminance reflected by the screen, and
    a second photoelectric sensor attached to the observer's head, and located at a distance from the luminous image and in a vicinity of an observer's head, to pick up an ambient illumination in said vicinity and to provide a second detected signal representing background luminance received in the observer's total field of vision.

2. A system according to claim 1 wherein said means for adjustment of the luminosity of the image comprise a) a correction signal generating circuit including said manual adjustment means having two inputs which respectively receive said first and second signals coming from said sensors and for delivering a correction signal through an output; and b) a correcting circuit receiving said correction signal and receiving said image to be displayed, and feeding said display device through an output.

3. A system according to claim 2, wherein the correcting circuit shows a variable gain when acted upon by said correction signal.

4. A system according to claim 2, wherein the correction signal generating circuit comprises:
    a first circuit to process the first signal provided by the first sensor, said first circuit producing a first correction signal in response to said manual adjustment means and the ambient illumination received by the first sensor,
    a second circuit to process the second signal detected by the second sensor, and to produce a second correction signal depending on the background luminance perceived by the observer, and
    an adding circuit to add said first and second correction signals and to produce a sum signal applied to said correcting circuit.

5. A system according to claim 4 wherein the first and second circuits further comprise first and second weighing circuits respectively, said first and second weighing circuits being connected between said respective first and second circuits and said adder circuit to introduce predetermined weighting coefficients to optimize the response to the system according to lay-out and operational data.

6. A system according to claim 1 wherein the second sensor comprises:
   a housing bored through so as to form a cavity, said housing comprising a set having a photopic filter and a diffuser and being located on an open side to receive radiation; and
   a phototransistor located at a bottom of said cavity.

7. A system according to claim 6 wherein said second sensor is attached to the observer's head in a way such that it has an axis which is oriented so that it is substantially concurrent with the axis of vision at the image displayed on the screen which axis moves as the observer moves his head.

8. A system as in claim 1, wherein the second sensor provides said second detected signal through a time constant device.

* * * * *